United States Patent [19]

Binder et al.

[11] Patent Number: 5,328,782
[45] Date of Patent: Jul. 12, 1994

[54] TREATED POROUS CARBON BLACK CATHODE AND LITHIUM BASED, NONAQUEOUS ELECTROLYTE CELL INCLUDING SAID TREATED CATHODE

[75] Inventors: Michael Binder, Brooklyn, N.Y.; Robert J. Mammone, So. Plainfield; William L. Wade, Jr., Neptune, both of N.J.

[73] Assignee: The United States of America as represented by the Secretary of the Army, Washington, D.C.

[21] Appl. No.: 959,597

[22] Filed: Oct. 13, 1992

[51] Int. Cl.$^5$ ............................................. H01M 2/12
[52] U.S. Cl. ..................................... 429/101; 429/232
[58] Field of Search ................................ 429/232, 101

[56] References Cited

U.S. PATENT DOCUMENTS 4,615,959  8/1986  Hayashi et al. .................... 429/232

FOREIGN PATENT DOCUMENTS 0145670  11/1981  Japan .................................. 429/232

*Primary Examiner*—David B. Springer
*Attorney, Agent, or Firm*—Michael Zelenka; Roy E. Gordon

[57] ABSTRACT

A porous carbon black cathode is treated by brief exposure to a low pressure, room temperature gas plasma. The treated cathode is suitable for inclusion in a lithium based, nonaqueous electrolyte cell.

10 Claims, No Drawings

TREATED POROUS CARBON BLACK CATHODE AND LITHIUM BASED, NONAQUEOUS ELECTROLYTE CELL INCLUDING SAID TREATED CATHODE

GOVERNMENT INTEREST

The invention described herein may be manufactured, used, and licensed by or for the Government for governmental purposes without the payment to us of any royalty thereon.

FIELD OF INVENTION

This invention relates in general to a treated porous carbon black cathode and in particular to a lithium based, nonaqueous electrolyte cell including said treated cathode.

BACKGROUND OF THE INVENTION

When lithium based, nonaqueous electrolyte cells made with porous carbon black cathodes are discharged at low temperatures, the near surface regions of the cathode are primarily utilized. Cathode surfaces contain such pendant chemical functionalities as alcohol, carboxyl, carbonyl, or esters that can significantly impact the electrochemical kinetics of reduction reactions taking place at the cathode surface. This is because adsorption, charge transfer reactions, as well as acid base reactions that take place on cathode surfaces in addition to cathode surface conductivity may be modified by the presence of various functional groups on the cathode surface. The exact role of surface structure in controlling the performance of cathodes has been an important question. If cathode surface chemistries can be substantially modified, under-load voltages of cells discharged at high rates and/or low temperatures should be markedly altered.

Chemical or physical modification of porous carbon cathodes have long been the primary means of increasing cell capacities or under-load voltage of various lithium based oxyhalide cells. Approaches that have been used to improve cathode performance in lithium—sulfur dioxide cells, for example, have included: use of additives; catalysts; selection of carbon blacks with specific surface and/or bulk properties; using blends of various carbon blacks having synergistic properties; or soaking carbon blacks with various solvents to remove impurities. However, each of these methods suffer from one or more serious drawbacks and are therefore not widely used in $Li/SO_2$ cell manufacturing.

SUMMARY OF THE INVENTION

The general object of this invention is to provide an improved lithium based, nonaqueous electrolyte cell including a porous carbon black cathode. A more specific object of the invention is to provide such an improved cell in which underload voltages, cell capacities, and voltage delay during low temperature discharge are improved.

It has now been found that by briefly exposing thick porous carbon black cathodes to a low pressure of about 20 to 250 mTorr, room temperature gas plasma prior to including the cathode in a $Li/SO_2$ cell that the under load voltages, cell capacities and voltage delay during low temperature discharge of the $Li/SO_2$ cell are greatly improved.

The gas plasma treatment is an inexpensive, easy to use, safe, dry, process in which vapor phase reactive species collide with a materials surface and rupture covalent bonds to form radicals and ions. Reaction between exposed surfaces and the reactive atmosphere then occurs. Plasma pretreatment can alter solid materials by either: removing surface contaminants; ablation of a thin layer of the material itself; crosslinking of the materials surface region; activation of the material's surface and subsequent reaction with the ambient atmosphere; or incorporation of plasma constituents within the material. Gas plasma pretreatments have a distinct advantage over solvent cleaning in that free radical chemical reactions involved in plasma pretreatment do not leave organic contaminants on the surface. Furthermore, by solely changing the process gas, that is, the gaseous environment during plasma treatment, it is possible to introduce various functional groups that is, oxygen containing groups onto surfaces. This treatment should be of interest to battery technologists because fabricated carbon based cathodes of any size can be readily and inexpensively processed during the normal cathode manufacturing process.

In this application there is reported results of exposing porous carbon black cathodes prior to inclusion or assembly in sealed cells to low temperature, low pressure gas plasma. Hermetically sealed "D" sized $Li/SO_2$ cells, are assembled with these treated cathodes and evaluated after long term storage. The rationale behind this study is the expectation that brief exposure of carbon cathodes to a gas plasma may inter alia, chemically transform —C—H, —C—OH, —CHO or —COOH functional groups into other groups that are perhaps more amenable to charge transfer reactions. These effects should be more pronounced during low temperature and/or high rate discharge where carbon cathode surfaces are primarily utilized.

An additional benefit of plasma treated cathodes is the removal of various organic or inorganic impurities from porous cathode surfaces and/or bulk. These impurities, which normally could leach out from the cathode into the electrolyte and react with lithium anode surfaces, are thought to be responsible for anode passivation (and resulting voltage startup delay) commonly experienced by lithium cells after prolonged storage at elevated temperatures. Removal of these impurities by action of the gas plasma should result in decreased startup delays and higher startup voltages.

DESCRIPTION OF THE PREFERRED EMBODIMENT

Fully fabricated, tabbed porous, 90% Shawinigan black 10% Teflon ® cathodes ($22'' \times 1.5'' \times 0.030''$) are exposed for 4 minutes to either 100% oxygen, 100% ammonia, or a mixture of 96% $CF_4$/4% $O_2$ gas plasmas at 2.50 mTorr in a plasma etcher at plasma power levels of 0,002 watts/cm3. All cathodes (including the baseline) are then dried, rolled, and spirally wound with glass filter separator and lithium foil into "D" sized cells. These cells are filled with the standard electrolyte for $Li/SO_2$ cells (acetonitrile, sulfur dioxide and lithium bromide), allowed to equilibrate for 2 days, and then pulsed at 10.5A at room temperature while monitoring load voltages. In additional embodiments, cells of each type were stored for approximately 4 weeks at 71° C. and then discharged at 3A constant current at $-28°$ C.

The reason for using these three gas plasmas to treat carbon cathodes is as follows. Exposure of cathodes to oxygen gas plasma is expected to oxygenate surface functional groups thus forming acidic functional groups on the cathode surface; exposure to ammonia gas plasma is expected to form basic groups on the cathode surface; while exposure to $CF_4/O_2$ plasma is expected to fluorinate chemical groups on cathode surfaces and perhaps make the cathode more conductive.

TABLE 1. Under-load voltage during room temperature 10.5A pulse on unstored $Li/SO_2$ "D" size cells constructed with carbon cathodes that have been briefly exposed to various gas plasmas.

| PLASMA TREATMENT OF CATHODES | LOAD VOLTAGE OF $Li/SO_2$ D CELL UNDER 10.5 PULSE LOAD, Volts |
|---|---|
| NONE | 2.12 ± .08 |
| AMMONIA | 2.13 ± .06 |
| OXYGEN | 2.12 ± .13 |
| $CF_4/O_2$ | 2.12 ± .08 |

Table 1 lists average under-load voltages of hermetically sealed $Li/SO_2$ cells constructed with various plasma treated porous carbon cathodes. These cells are tested prior to their being stored at 71° C. The data shows no significant differences between the different treated cathodes. It is interesting to note that cells containing oxygen plasma treated cathode have considerably more scatter in load voltages than do baseline cells.

TABLE 2. Open circuit voltages, startup times, startup voltages, average load voltages, and cell capacities of various D sized $Li/SO_2$ cells discharged at 3A @ −28° C. Cathodes in these cells have been exposed to one of three different gas plasmas prior to cell fabrication.

| PLASMA TREATMENT | OCV | STARTUP TIME sec. | STARTUP VOLTAGE volts | LOAD VOLTAGE volts | CAPACITY AH |
|---|---|---|---|---|---|
| NONE | 3.016 ± .001 | 0.89 ± 0.46 | 2.16 ± .01 | 2.28 ± .01 | 3.56 ± .07 |
| AMONIA | 3.014 ± .002 | 1.65 ± 1.39 | 2.15 ± .03 | 2.29 ± .01 | 3.64 ± .09 |
| OXYGEN | 3.024 ± .003 | 0.84 ± 0.55 | 2.16 ± .01 | 2.29 ± .01 | 3.66 ± .17 |
| $CF_4/O_2$ | 3.016 ± .002 | 2.24 ± 1.39 | 2.12 ± .04 | 2.28 ± .01 | 3.61 ± .11 |

Table 2 shows open circuit voltages, startup times, startup voltages, average load voltages, and overall ampere-hour capacities when hermetically sealed, D-sized, $Li/SO_2$ cells, constructed with plasma treated, porous carbon cathodes, are discharged @ 3A and −28° C. These cells have been stored for approximately 3 weeks at room temperature. Cells constructed from plasma treated cathodes show higher open circuit voltage, less delay times and greater ampere hour capacities than baseline cells made with untreated cathodes. The fact that OCV of cells containing oxygen plasma treated cathodes are slightly higher than that of baseline cells may be significant because it implies that cathode reduction potentials have been changed. It is reasonable to surmise that oxygen plasma, in some way, beneficially modifies the chemical structure of the cathode. The slightly increased capacity in cells constructed with oxygen plasma treated cathodes may be either due to removal of impurities from cathode pores or enlargement of pore sizes.

TABLE 3. Open circuit voltages, startup times, startup voltages, average load voltages, and cell capacities of various D sized $Li/SO_2$ cells discharged at 3A @ −28° C. after one month storage at 71° C. Cathodes in these cells had been exposed to one of three different gas plasmas prior to cell fabrication.

| PLASMA TREATMENT | OCV | STARTUP TIME sec. | STARTUP VOLTAGE volts | LOAD VOLTAGE volts | CAPACITY AH |
|---|---|---|---|---|---|
| NONE | 3.024 ± .051 | 5.36 ± 3.54 | 2.08 ± .05 | 2.24 ± .01 | 3.13 ± .15 |
| AMMONIA | 3.035 ± .005 | 3.79 ± 0.31 | 2.09 ± .01 | 2.28 ± .01 | 3.62 ± .12 |
| OXYGEN | 3.051 ± .003 | 3.36 ± 0.29 | 2.10 ± .01 | 2.27 ± .01 | 3.48 ± .24 |
| $CF_4/O_2$ | 2.995 ± .043 | 1.77 ± 1.47 | 2.14 ± .05 | 2.28 ± .01 | 3.54 ± .15 |

Table 3 shows the results of OCV, startup voltage, load voltage and capacities in fully constructed cells containing treated cathodes after these cells have been stored at 71° C. (160° F.) for one month. It is noted that these cells are discharged at rates that are 50% higher than normal, 2A rated currents, and the cells are discharged at −28° C. without the advantages of heating from adjacent cells (normally experienced by individual cells in a battery pack). Therefore, substantially greater effects should be observed in actual batteries.

The invention also contemplates the use of oxyhalide based cells such as thionyl chloride, sulfuryl chloride etc.

We wish it to be understood that we do not desire to be limited to the exact details of construction shown and described for obvious modifications will occur to a person skilled in the art.

What is claimed is:

1. A lithium/sulfur dioxide cell including a porous carbon black cathode of about 90 percent carbon black and about 10 percent Teflon ® wherein the cathode is plasma gas treated with a gas plasma selected from the group consisting of $O_2$, $NH_3$ and $GF_4/O_2$ for about 4 minutes at a pressure of about 20 to 250 mTorr and at room temperature prior to inclusion of the cathode in the cell.

2. A lithium/sulfur dioxide cell according to claim 1 wherein the gas plasma is ammonia.

3. A lithium/sulfur dioxide cell according to claim 1 wherein the gas plasma is oxygen.

4. A lithium/sulfur dioxide cell according to claim 1 wherein the gas plasma is $CF_4/O_2$.

5. A lithium/sulfur dioxide cell according to claim 1 wherein the lithium/sulfur dioxide cell including the gas plasma treated cathode is stored for about 3 weeks at room temperature prior to the testing of the cell.

6. A porous carbon black cathode of about 90 percent carbon black and about 10 percent Teflon ® that has been treated by brief exposure to a low pressure, room temperature gas plasma selected from the group consisting of $O_2$, $NH_2$, and $CF_4/O_2$ for about 4 minutes at a pressure of about 20 to 250 mTorr and at room temperature said treated cathode being suitable for inclusion in a lithium/sulfur dioxide cell.

7. A treated porous carbon black cathode according to claim 6 wherein the gas plasma is ammonia.

8. A treated porous carbon black cathode according to claim 6 wherein the gas plasma is oxygen.

9. A treated porous carbon black cathode according to claim 6 wherein the gas plasma is $CF_4/O_2$.

10. A treated thick porous carbon black cathode according to claim 1 wherein the lithium based cell is a $Li/SO_2$ cell. cell.

* * * * *